United States Patent
Korniyenko et al.

(10) Patent No.: US 7,107,835 B2
(45) Date of Patent: Sep. 19, 2006

(54) THERMAL MASS FLOW SENSOR

(75) Inventors: Oleg Korniyenko, Burlington (CA); David V. Chandu-Lall, Georgetown (CA); Daesik Park, Mississauga (CA)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 10/936,122

(22) Filed: Sep. 8, 2004

(65) Prior Publication Data

US 2006/0048568 A1    Mar. 9, 2006

(51) Int. Cl.
G01F 1/68 (2006.01)
G01N 15/00 (2006.01)

(52) U.S. Cl. ............... 73/204.22; 73/866.5; 73/205.26
(58) Field of Classification Search ........... 73/204.22, 73/204.25, 204.26, 866.5
See application file for complete search history.

(56) References Cited

U.S. PATENT DOCUMENTS

| | | | |
|---|---|---|---|
| 4,399,697 A | 8/1983 | Kohama et al. | |
| 4,682,496 A | 7/1987 | Miura et al. | |
| 4,776,213 A | 10/1988 | Blechinger et al. | |
| 4,794,795 A * | 1/1989 | Djorup | 73/170.12 |
| 4,843,882 A * | 7/1989 | Ohta et al. | 73/204.26 |
| 4,899,584 A * | 2/1990 | McQueen | 73/204.21 |
| 5,024,083 A * | 6/1991 | Inada et al. | 73/204.26 |
| 5,086,650 A * | 2/1992 | Harrington et al. | 73/204.21 |
| 5,231,877 A | 8/1993 | Henderson | |
| 5,237,867 A | 8/1993 | Cook, Jr. | |
| 5,417,110 A | 5/1995 | Wood | |
| 5,465,618 A * | 11/1995 | Yasui et al. | 73/204.27 |
| 5,477,734 A | 12/1995 | Zemel et al. | |
| 5,515,295 A * | 5/1996 | Wang | 73/204.26 |
| 5,533,412 A * | 7/1996 | Jerman et al. | 73/861.95 |
| 5,682,899 A * | 11/1997 | Nashef et al. | 73/204.16 |
| 5,780,737 A | 7/1998 | Wible et al. | |
| 5,792,952 A * | 8/1998 | Ritchart | 73/204.27 |
| 5,804,720 A | 9/1998 | Morimasa et al. | |
| 5,880,365 A | 3/1999 | Olin et al. | |
| 5,892,150 A | 4/1999 | Isono et al. | |
| 6,085,588 A * | 7/2000 | Khadkikar et al. | 73/204.27 |
| 6,098,455 A | 8/2000 | Nukui et al. | |
| 6,125,695 A * | 10/2000 | Alvesteffer et al. | 73/204.27 |
| 6,134,960 A | 10/2000 | Yamakawa et al. | |
| 6,208,254 B1 | 3/2001 | McQueen et al. | |
| 6,230,559 B1 | 5/2001 | Igarashi et al. | |
| 6,279,394 B1 * | 8/2001 | Svoboda et al. | 73/204.26 |

(Continued)

FOREIGN PATENT DOCUMENTS

GB    2 373 332 A    9/2002

*Primary Examiner*—Harshad Patel
(74) *Attorney, Agent, or Firm*—Birch, Stewart, Kolasch, Birch LLP (57) ABSTRACT

A thermal mass flow sensor is disclosed that includes a housing (16) having a first sensor region and a second sensor region, a first thin film temperature sensor (39) formed at the first sensor region and a second thin film temperature sensor (58) formed at the second sensor region. A heating element (40) is arranged to heat the first temperature sensor (39) and a controller (46) is operably connected to the first temperature sensor (39), the second temperature sensor (58) and the heating element (40), and controls a power level to the heating element (40) to maintaining a temperature difference between the first temperature sensor (39) and the second temperature sensor (58). A thin film temperature sensor and a method of using the thermal mass flow sensor are also disclosed.

36 Claims, 7 Drawing Sheets

U.S. PATENT DOCUMENTS

| | | |
|---|---|---|
| 6,354,150 B1 * | 3/2002 | Rudent et al. .............. 73/202.5 |
| 6,382,023 B1 | 5/2002 | Yonezawa et al. |
| 6,397,673 B1 * | 6/2002 | Kanke et al. ............ 73/204.11 |
| 6,487,904 B1 | 12/2002 | Myhre |
| 6,591,674 B1 | 7/2003 | Gehman et al. |
| 6,628,202 B1 * | 9/2003 | McQueen et al. .......... 340/603 |
| 6,631,638 B1 | 10/2003 | James et al. |
| 6,637,264 B1 * | 10/2003 | Lotters et al. ........... 73/204.27 |
| 6,658,931 B1 | 12/2003 | Plumb et al. |
| 6,763,712 B1 * | 7/2004 | Crosbie et al. .......... 73/204.26 |
| 2003/0097875 A1 | 5/2003 | Lentz et al. |

* cited by examiner

FIG.11

THERMAL MASS FLOW SENSOR

FIELD OF THE INVENTION

The present invention is directed toward an improved thermal mass flow sensor, and, more specifically, toward a low power, thermal mass flow sensor that provides a rapid and substantially linear output in response to flow changes.

BACKGROUND OF THE INVENTION

Thermal mass flow sensors operate by maintaining a temperature difference between two elements mounted in a mass flow passageway. A heating element is generally provided to heat one of the elements, and the temperatures of the elements are monitored. A mass flow, such as a mass of air, moving through the passageway and over the two elements cools the heated element. Large mass flows cool the heated element to a greater extent than do small mass flows. The amount of power required to maintain a given temperature difference therefore provides an indication of the mass flow.

Known thermal mass flow sensors suffer from several shortcomings. For example, with many designs, there is a non-linear relationship between the flow rate and the power required to maintain a temperature difference. Moreover, some sensors require significant power to operate, and many have slow response times. And, while a particular sensor may function adequately in a given environment, it is difficult to replicate the characteristics of that sensor and to make multiple sensors having the same output characteristics. Thus, recalibration is required each time a sensor is replaced. It is therefore desirable to provide a thermal mass flow sensor that addresses these and other shortcomings.

SUMMARY OF THE INVENTION

These and other shortcomings of prior temperature sensors are addressed by the present invention, which comprises, in a first aspect, a thermal mass flow sensor that includes a housing having a first sensor region and a second sensor region. A first thin film temperature sensor is formed at the first sensor region, and a second thin film temperature sensor is formed at the second sensor region. A heating element is arranged to heat the first temperature sensor, and a controller is operably connected to the first temperature sensor, the second temperature sensor and the heating element in order to control a power level to the heating element to maintain a temperature difference between the first temperature sensor and the second temperature sensor.

Another aspect of the invention comprises a flow sensing element for use in a thermal mass flow sensor that includes a substrate, a planar resistive thermal device (RTD) supported by the substrate that has a periphery, and a planar heating element comprising a strip of resistive material disposed along the periphery of the RTD.

A further aspect of the invention comprises a method of measuring mass flow that involves providing a first planar temperature sensor and a second planar temperature sensor and mounting a planar heating element along the first planar temperature sensor. Next, the first planar temperature sensor is mounted in a mass flow passageway defining a mass flow direction at a first angle to the mass flow direction, and the second planar temperature sensor is mounted in the mass flow passageway at a second angle to the mass flow direction. A predetermined temperature difference is maintained between the first temperature sensor and the second temperature sensor, and a mass flow is determined from the amount of power required to maintain the predetermined temperature difference.

An additional aspect of the invention comprises a method of forming a flow sensing element for use in a thermal mass flow sensor that involves providing a substrate, depositing a thin film of platinum on the substrate, forming a thin film strip of TaN on the platinum, electrically connecting the platinum film to a controller, and electrically connecting the strip of TaN to the controller.

A further aspect of the invention comprises a thermal mass flow sensor that includes a housing comprising a first support region and a second support region, a first substrate at the first support region and a second substrate at the second support region. A first planar temperature sensor is formed on the first substrate, a second planar temperature sensor is formed on the second substrate, and a heating element is arranged to heat the first temperature sensor. A controller is operably connected to the first temperature sensor, the second temperature sensor and the heating element and controls a power level to the heating element to maintain a temperature difference between the first temperature sensor and the second temperature sensor.

Another aspect of the invention comprises a flow sensing element for use in a thermal mass flow sensor that includes a substrate, a thin film RTD formed on the substrate and having a periphery, and a thin film heating element formed along the periphery of the RTD.

An additional aspect of the invention comprises a method of measuring mass flow that involves providing a first thin film RTD and a second thin film RTD and forming a thin film heating element around the first thin film RTD. The first thin film RTD is mounted in a mass flow passageway defining a mass flow direction at a first angle to the mass flow direction, and the second thin film RTD is mounted in the mass flow passageway at a second angle to the mass flow direction. A predetermined temperature difference is maintained between the first RTD, and second RTD and a mass flow is determined from an amount of power required to maintain the predetermined temperature difference.

BRIEF DESCRIPTION OF THE DRAWINGS

These and other benefits of the present invention will be better understood after a reading of the following detailed description together with the following drawings wherein.

DETAILED DESCRIPTION

Figure 1:
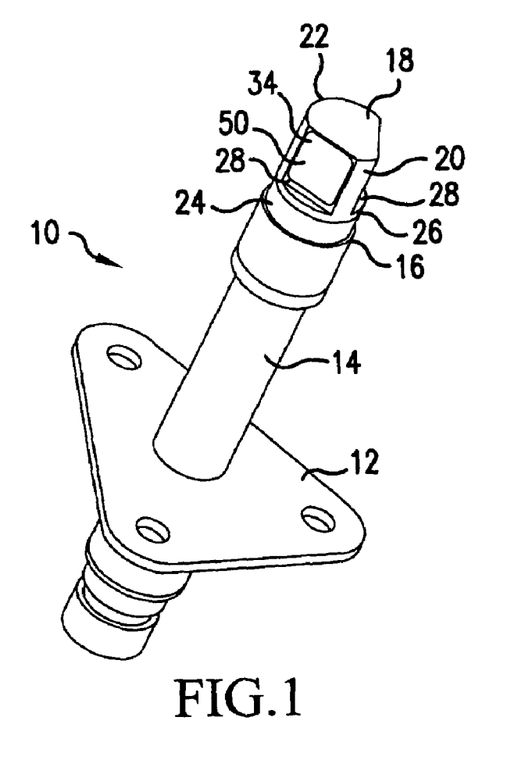
FIG. 1 is a perspective view of a mass flow sensor including a housing supporting a mass flow sensing element and a temperature sensing element according to an embodiment of the present invention.

Referring now to the drawings, wherein the showings are for purposes of illustrating preferred embodiments of the invention only, and not for the purpose of limiting same, FIG. 1 illustrates a mass flow sensor 10 comprising a mounting plate 12, a hollow mast 14 extending through (or integrally formed with) mounting plate 12, and a housing 16 attached to hollow mast 14 by a suitable chemical adhesive or by laser welding, for example. Housing 16, also illustrated in FIG. 2, includes a top wall 18, a front wall 20, a rear wall 22, and first and second sidewalls 24, 26. Each of the first and second walls 24, 26 includes a recessed mounting portion 28 with an opening 30 into the interior of housing 16 for receiving sensing elements described hereafter. Front wall 20 also includes a portion 29 of reduced thickness that functions as a thermal choke to reduce heat transfer between first sidewall 24 and second sidewall 26. As will be appreciated from FIG. 6, front wall 20 and rear wall 22 comprise arcs of a circle, while first and second sidewalls 24, 26 comprise chords of that circle.

Figure 3:
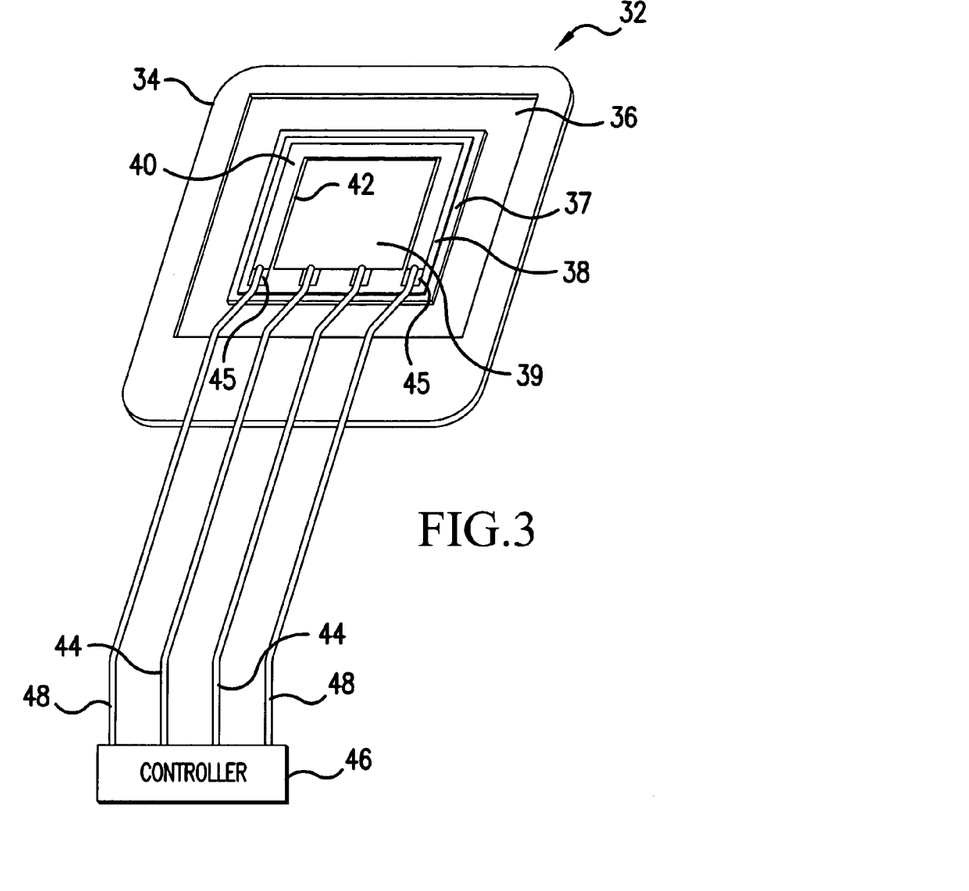
FIG. 3 is a perspective view of the mass flow sensing element of FIG. 1.

A first sensing element 32, illustrated in FIG. 3, comprises a carrier 34 formed from an iron-chromium alloy (FeCrAlloy). Carrier 34 includes a portion 36 having a reduced thickness which functions as a thermal choke, and a central portion 37. Thermal choke 36 is optional, and carrier 34 may alternately be formed with a planar surface and without the thermal choke. A substrate 38 is formed on the central portion 37 of carrier 34, such as by brazing, for example, from a material such as aluminum oxide to provide electrical insulation between the carrier and the elements described hereafter. Substrate 38 is preferably about 0.010 inches thick. A resistive temperature detector 39 (hereinafter "RTD") is formed in a central location on substrate 38 from a material having a high thermal coefficient of resistance such as platinum. The carrier and the substrate material should be chosen to have similar coefficients of thermal expansion to avoid possible damage to the flow sensing element 32 from different rates of expansion and contraction as the sensor is heated and cooled during use. A planar heating element 40 is formed around the periphery 42 of the RTD. The heating element 40 may be formed, for example, from a material such as tantalum nitride (TaN) or Nichrome having a nominal resistance of about 20 ohms. The RTD 39 and the heating element 40 are preferably formed as thin films by a suitable process such as chemical vapor deposition, sputtering, etc.

Figure 2:
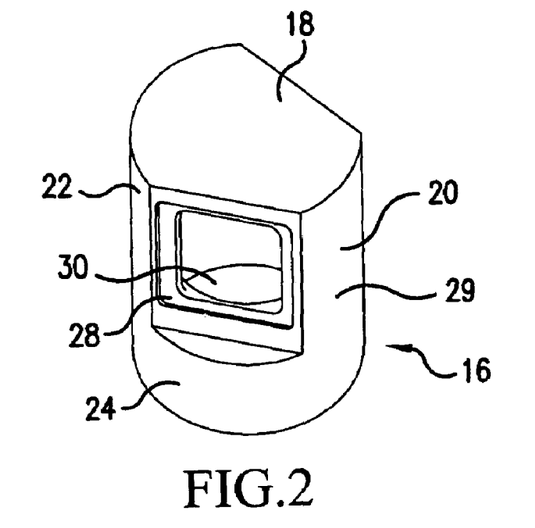
FIG. 2 is a perspective view of the housing of FIG. 1 with the sensing elements removed.
Figure 6:
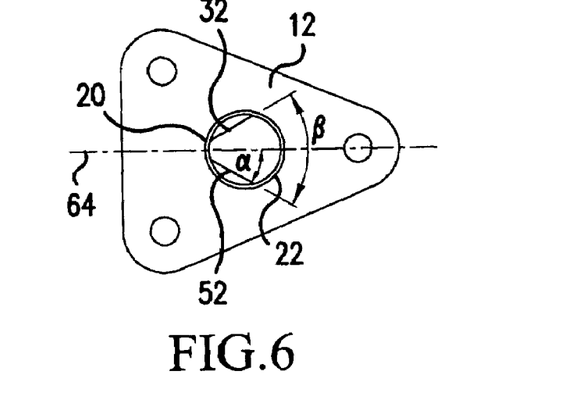
FIG. 6 is a top plan view of the mass flow sensor of FIG. 1.
Figure 7:
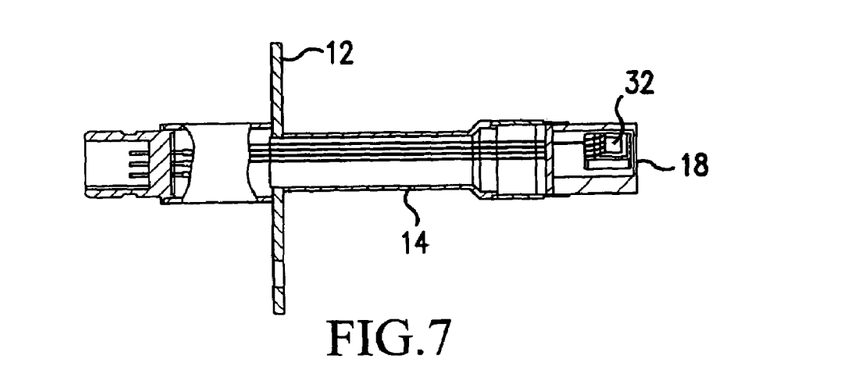
FIG. 7 is a sectional elevational view taken along line 7—7 of FIG. 5.

A first pair of leads 44 connects the RTD 39 to a controller 46 via gold pads 45 connected to the RTD 39, illustrated for example, in FIG. 6, and a second pair of leads 48 connects the heating element 40 to the controller 46 via additional gold pads 45. As illustrated in FIG. 7, temperature sensing element 32 is mounted in housing 16 such that RTD 39 and heating element 40 face the interior of housing 16 while the rear side 50 of heating element 40 faces outwardly as illustrated in FIG. 2 and is exposed to the ambient atmosphere surrounding flow sensor 10.

Figure 4:
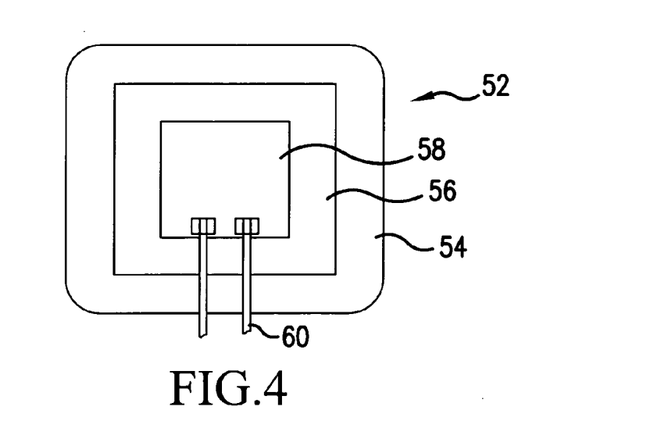
FIG. 4 is a front elevational view of the temperature sensing element of FIG. 1.
Figure 5:
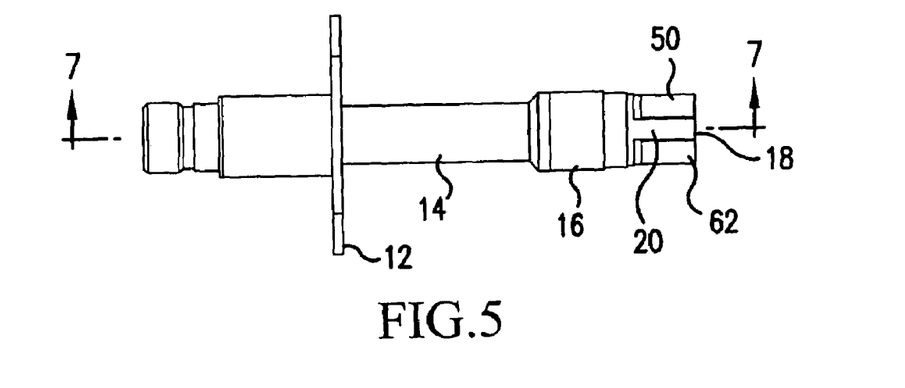
FIG. 5 is a side elevational view of the mass flow sensor of FIG. 1.

A second sensing element 52, best seen in FIGS. 4 and 5, is mounted in recessed mounting portion 28 of second sidewall 26, and comprises a substrate 54 having a portion 56 of reduced thickness forming a thermal choke 56, and a second RTD 58 formed on substrate 54. Leads 60 connect the second RTD 58 to controller 46. Second sensing element 52 is mounted in the recessed mounting portion 28 of second sidewall 26 with a rear face 62 facing outwardly from housing 16.

Referring now to FIG. 6, sensing element 10 is shown divided by a center line 64 running between front wall 20 and rear wall 22. First sensing element 32 and second sensing element 52 are preferably mounted at equal angles α from this center line, and are separated from one another by a second angle β equal to 2α. Flow sensing element 10 is preferably mounted in a mass flow passage way with center line 64 aligned with the direction of mass flow and front wall 20 facing in the direction of the mass flow. This arrangement exposes first sensing element 32 and second sensing element 52 to substantially equal amounts of mass flow, assuming the sensor is mounted at a location in the mass flow passageway where airflow is substantially laminar. Because the relationship of the first and second sensing elements to the housing is fixed by the geometry of the housing, and the housing can be accurately attached to the mast, the present arrangement can readily and accurately be replicated to produce a multiple sensors having very similar response characteristics.

The basic operation of the mass flow sensor 10 will now be described. The mass flow sensor 10 is mounted in a mass flow passageway so that centerline 64 is aligned with the direction of mass flow and front wall 20 faces into the mass flow. Controller 46 monitors the temperature detected by first RTD 39 and second RTD 58 and provides power to heating element 40 sufficient to maintain a temperature difference $\Delta T$, such as 100° F., between first RTD 39 and second RTD 58. Mass flow past the heated RTD 39 cools the heated RTD 39, and the amount of cooling is proportional to the amount of mass flow. Consequently, the amount of power required to maintain a temperature difference is related to the mass flow.

Two countervailing factors influence the selection of the temperature difference $\Delta T$: the temperature difference should be made as high as possible to minimize errors and to increase the sensitivity of the thermal mass flow sensor and 2) the temperature difference should be made as low as possible to minimize power consumption and overheating of the RTD. The present applicant has found that a temperature difference of 50 to 500 degrees could be used and that a temperature difference of about 100 degrees F. provides good sensitivity while consuming an acceptable amount of power.

The power required to maintain the temperature difference is proportional to the mass air flow as shown by the formula:

$$P = (C_0(T) + C_1(T) \cdot (Q_M)^N) \cdot \Delta T$$

where P equals power (watts) $Q_M$ equals the mass flow rate in pounds per minute, $C_0(T)$ and $C_1(T)$ are coefficients related to the header geometry and the thermophysical properties of the mass flow and the flow sensing element materials, n is a coefficient related to the laminar/turbulent regime of the flow, $\Delta T$ is the temperature difference between the first and second RTD's 39, 58, and T is the flow temperature in degrees F.

Figure 8:
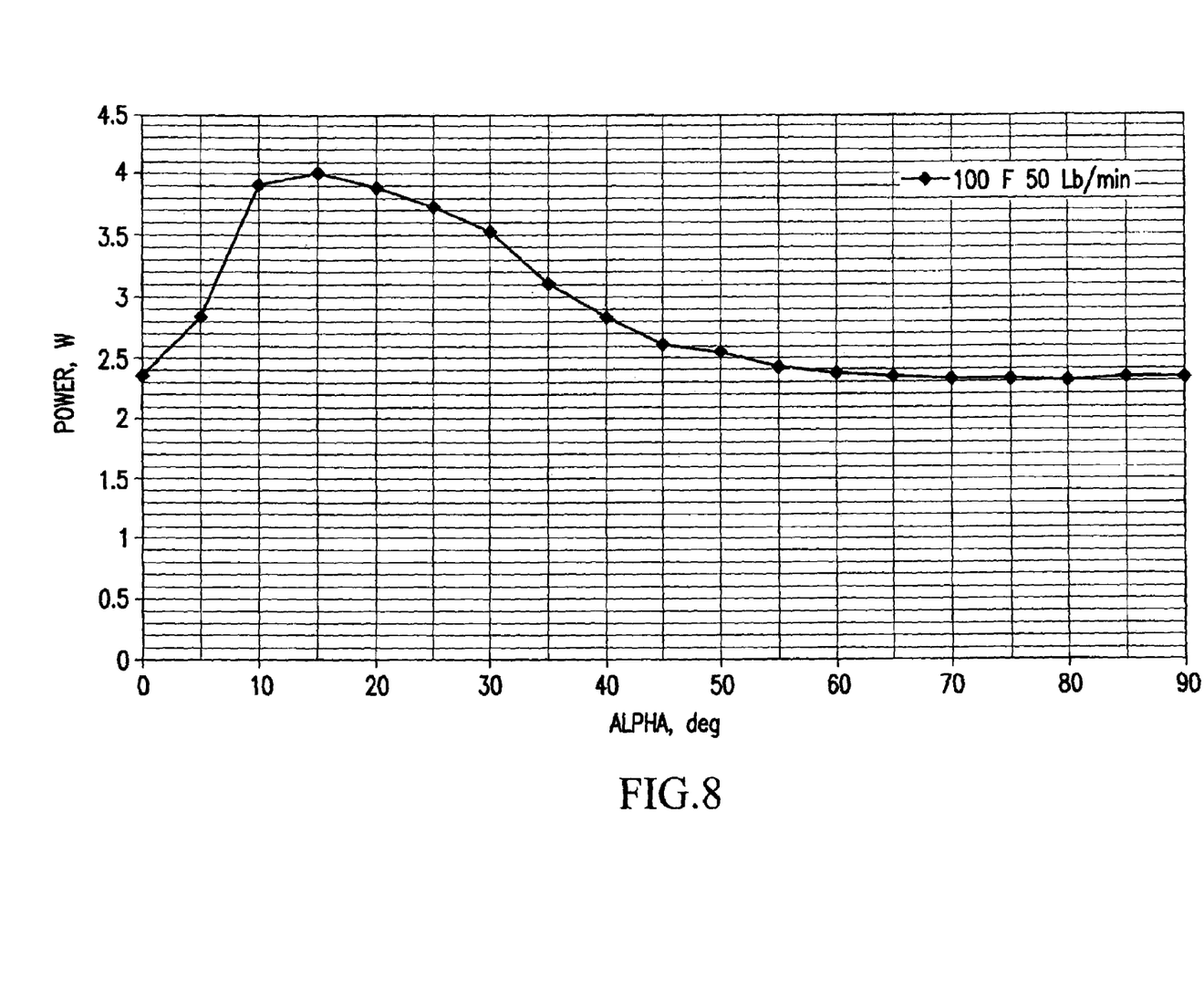
FIG. 8 is a graph showing the relationship between the power level required to maintain a temperature difference between two temperature sensors and the angle of one of the sensors to the mass flow direction.

The graph of FIG. 8 illustrates the relationship between the power required to maintain a 100° F. temperature difference between the first RTD 39 and second RTD 58 at a mass flow rate of 50 pounds per minute. As will be clear from this graph, maximum cooling of the RTD's occurs, and therefore maximum power is required to maintain the temperature difference, when angle alpha is equal to about 15°. Power consumption is also high at angles α ranging from 10° to 20°, and reasonably elevated at angles α between 6° and 35°. Setting angle α equal to approximately 15°, therefore, provides the greatest sensitivity for flow sensing element 10, while significant benefits are still obtained at angles α between 10° and 20° and, to some extent, at angles between about 6° and 35°.

Figure 9:
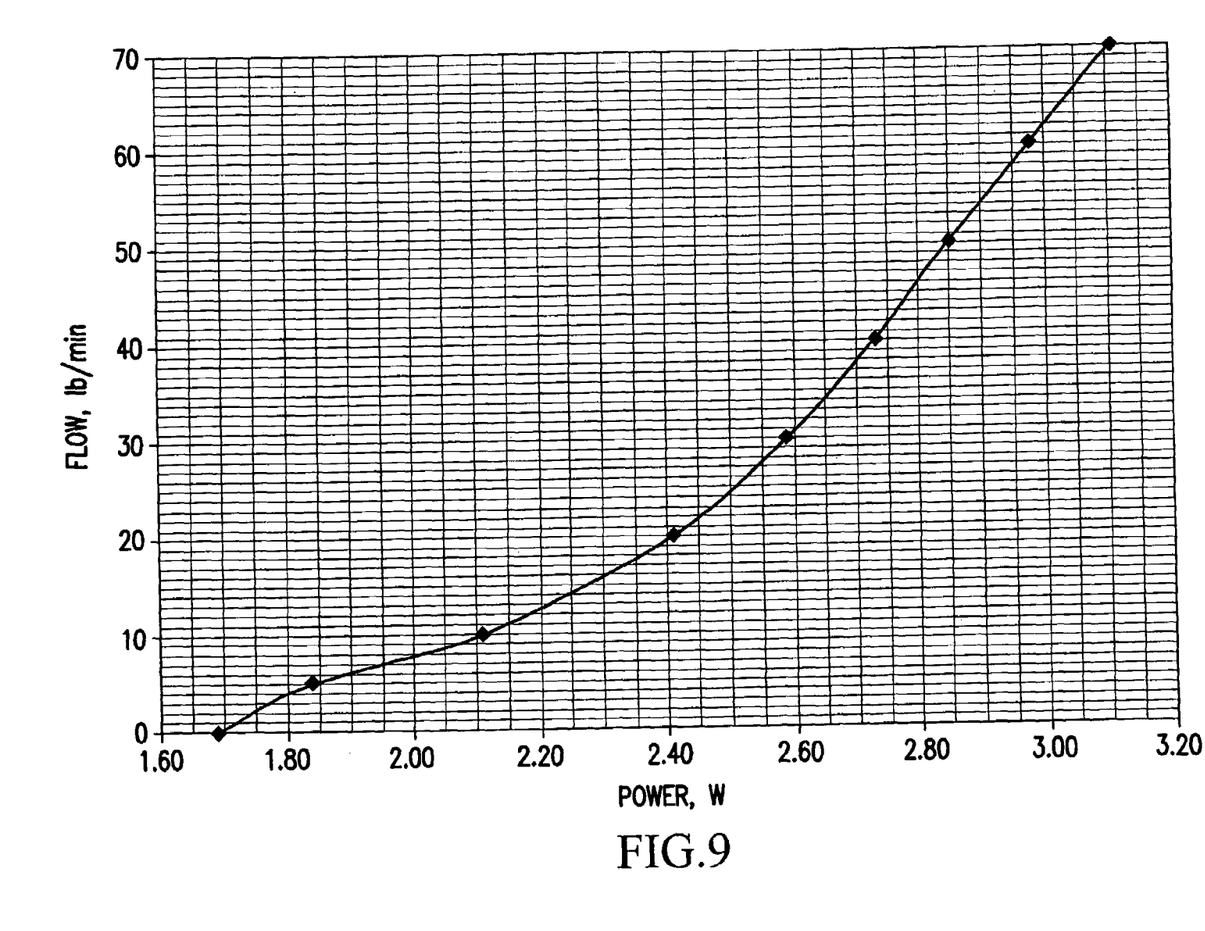
FIG. 9 is a graph showing the relationship between flow rate and power.

FIG. 9 illustrates the substantially linear relationship between flow rate and power consumption provided by the flow sensing device of this embodiment of the present invention over a range of flow rates from 0 to 70 pounds per minute. Control circuitry associated with the mass flow sensor of the present invention can therefore be significantly simplified and does not need to adjust for non-linear changes in power consumption. Greater accuracy can be obtained by noting that a first linear relationship exists between power consumption and flow rate over a mass flow range of 0 to about 15 pounds per minute and that a second linear relationship exists over a mass flow range of about 15 pounds per minute to 70 pounds per minute. Calculations based on two linear relationships are still significantly easier to perform than calculations based on the non-linear power to flow rate relationships found in conventional mass flow sensors.

Figure 10:
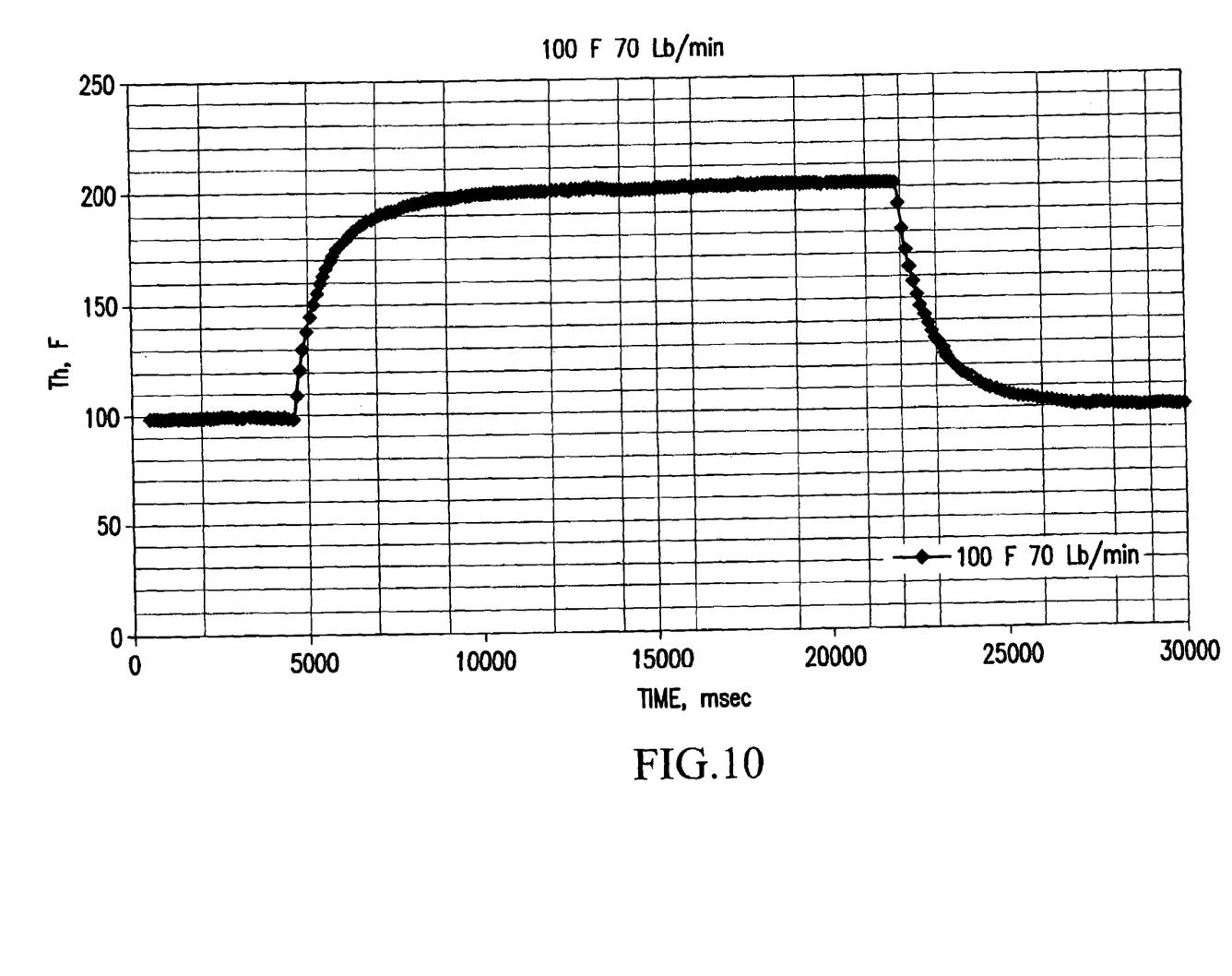
FIG. 10 is a graph showing the response time of the temperature sensor of FIG. 1.

FIG. 10 illustrates the rapid response time of first temperature sensing element 32. As illustrated in this figure, at a flow rate of 70 pounds per minute, a 100 degree F. temperature increase is detected by RTD 39 in less than 5 seconds. Known sensors do not exhibit this sensitivity, and thus flow rates may change substantially before being detected by a conventional mass flow sensor. The high sensitivity thus allows changes in mass flow rate to be reliably detected.

Figure 11:
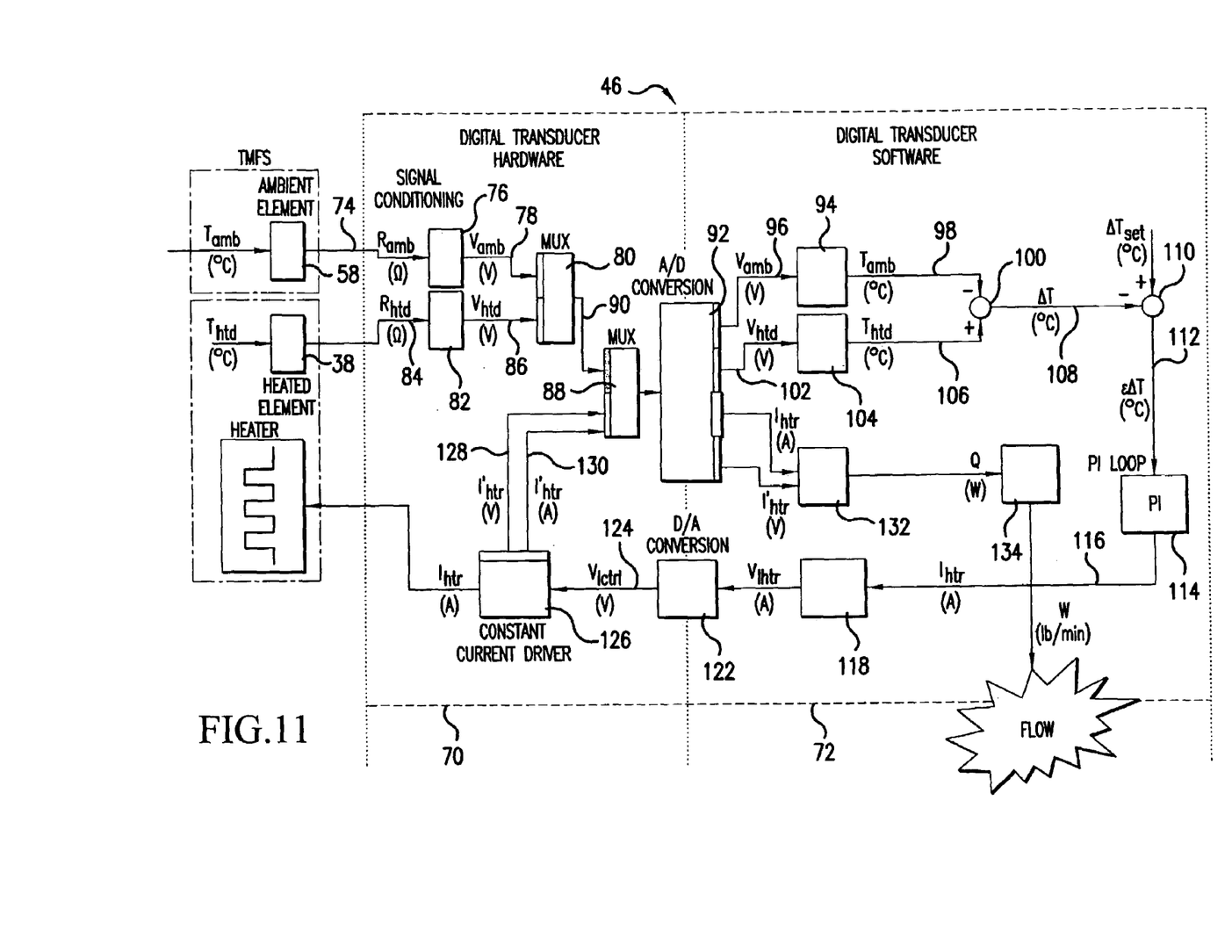
FIG. 11 is a schematic diagram showing a controller for controlling the mass flow sensor of FIG. 1.

FIG. 11 illustrates schematically the elements of controller 46. Controller 46 includes digital transducer hardware 70 and digital transducer software 72. The resistance of second sensing element 52 is measured via line 74 by a circuit 76 which circuit 76 outputs a voltage on line 78 to a first multiplexer 80 while the resistance of first RTD 39 is measured by a second circuit 82 via a line 84 and second circuit 82 outputs a voltage on line 86 to first multiplexer 80. First multiplexer 80 is connected to a second multiplexer 88 via a line 90, second multiplexer 88 is connected to an A/D converter 92 which outputs a voltage to circuit element 94 on line 96. Circuit element 94 produces an output on line 98 indicative of the temperature of second RTD 58, and line 98 is connected to a first comparator 100. A second line 102 connects A/D converter 92 to a circuit element 104 which converts the voltage on line 102 to an indication of the temperature of first RTD 39 on a line 106, and line 106 is connected to a second input of comparator 100. Comparator 100 outputs a temperature difference ΔT between the sensed temperature of RTD 58 and the sensed temperature of RTD 39, on line 108 which in turn is connected to a second comparator 110, a predetermined temperature difference ΔT is input into a second input of second comparator 110, and second comparator 110 outputs a signal on line 112 indicative of the error between the set temperature difference and the existing temperature difference, and this error signal is sent to a proportional integration loop 114. PI loop 114 outputs on line 116 a signal representing the current that should be supplied to heater 40 in order to maintain the desired temperature difference, the signal is received by a third circuit 118 which outputs on line 120 a voltage level necessary for maintaining the required current. This signal is received by a digital analog converter 122 which outputs a signal indicative of the required control voltage on line 124 to a constant current driver 126 connected to heating element 40.

Two signals are fed back from constant current driver 126 to first multiplexer 88 along a first line 128 and a second line 130. The signal on line 128 represents the voltage being applied to heater 40, while the signal on line 130 represents the current being supplied to heater 40. These values are converted to digital values by A/D converter 92 and fed to a circuit element 132 which calculates heater power consumption and sends a signal indicative of heater power consumption to circuit element 134 which in turn calculates the mass flow rate passed flow sensing element 10 from these values.

It should be recognized that additional variations of the above-described implementations may be reached without departing from the spirit and scope of the present invention.

The invention claimed is:

1. A thermal mass flow sensor comprising:
   a housing comprising a first sensor region and a second sensor region;
   a first thin film temperature sensor is formed at said first sensor region;
   a second thin film temperature sensor formed at said second sensor region and mounted at a first angle to said first thin film temperature sensor;
   a heating element arranged to heat said first temperature sensor; and
   a controller operably connected to said first temperature sensor, said second temperature sensor and said heating element, said controller controlling a power level to said heating element to maintain a temperature difference between said first temperature sensor and said second temperature sensor, wherein said first angle is from about 12 degrees to 70 degrees.

2. The sensor of claim 1 wherein said controller determines an airflow in a passageway from the power level.

3. The sensor of claim 1 wherein said first temperature sensor comprises a first RTD.

4. The sensor of claim 3 wherein said first temperature sensor comprises a periphery and said heating element comprises a strip disposed along said periphery.

5. The sensor of claim 4 wherein said strip at least partially surrounds said first RTD.

6. The sensor of claim 3 wherein said first temperature sensor is thermally insulated from said housing.

7. The sensor of claim 3 wherein said first temperature sensor is electrically insulated from said housing.

8. The sensor of claim 1 wherein said heating element is planar.

9. The sensor of claim 1 wherein said first angle is from about 20 to 40 degrees.

10. The sensor of claim 1 wherein said first angle is about 30 degrees.

11. The sensor of claim 1 further comprising a substrate, wherein said first temperature sensor comprises a first thin film deposited on said substrate and said heating element comprises a second thin film deposited on said substrate.

12. A thermal mass flow sensor comprising:
   a housing comprising a first sensor region and a second sensor region;
   a first thin film temperature sensor comprising an RTD formed at said first sensor region;
   a second thin film temperature sensor formed at said second sensor region;

a heating element arranged to heat said first temperature sensor;

a controller operably connected to said first temperature sensor, said second temperature sensor and said heating element, said controller controlling a power level to said heating element to maintain a temperature difference between said first temperature sensor and said second temperature sensor; and a mast connected to said housing and a mounting plate connected to said mast.

13. A thermal mass flow sensor comprising:

a housing comprising a first sensor region and a second sensor region;

a first thin film temperature sensor comprising an RTD formed at said first sensor region;

a second thin film temperature sensor formed at said second sensor region;

a heating element arranged to heat said first temperature sensor;

a controller operably connected to said first temperature sensor, said second temperature sensor and said heating element said controller controlling a power level to said heating element to maintain a temperature difference between said first temperature sensor and said second temperature sensor; and a thermal choke between said first temperature sensor and said housing.

14. A flow sensing element for use in a thermal mass flow sensor comprising:

a substrate;

a planar RTD supported by said substrate and having a periphery; and a planar heating element comprising a strip of resistive material surrounding said RTD.

15. The flow sensing element of claim 14 wherein said planar RTD comprises a thin film RTD.

16. The flow sensing element of claim 15 wherein said planar heating element comprises a thin film heating element.

17. A method of measuring mass flow comprising the steps of:

providing a first planar temperature sensor and a second planar temperature sensor;

mounting a planar heating element along the first planar temperature sensor;

mounting the first planar temperature sensor in a mass flow passageway defining a mass flow direction at a first angle to the mass flow direction;

mounting the second planar temperature sensor in the mass flow passageway at a second angle to the mass flow direction such that said first sensor is not parallel to said second sensor;

maintaining a predetermined temperature difference between the first temperature sensor and the second temperature sensor; and determining a mass flow from an amount of power required to maintain the predetermined temperature difference.

18. The method of claim 17 wherein the first angle is equal to the second angle.

19. The method of claim 17 wherein said step of mounting the first and second planar temperature sensors in a mass flow passageway comprises the step of mounting the first and second planar temperature sensors at an angle of about 6 to 35 degrees to the mass flow direction.

20. The method of claim 17 wherein said step of mounting the first and second planar temperature sensors in a mass flow passageway comprises the step of mounting the first and second planar temperature sensors at an angle of about 10 to 20 degrees to the mass flow direction.

21. The method of claim 17 wherein said step of mounting the first and second planar temperature sensors in a mass flow passageway comprises the step of mounting the first and second planar temperature sensors at an angle of about 15 degrees to the mass flow direction.

22. The method of claim 17 wherein said step of mounting the first and second planar temperature sensors in a mass flow passageway comprises the steps of providing a housing, mounting the first and second planar temperature sensors on the housing and mounting the housing in the mass flow passageway.

23. The method of claim 22 including the additional step of providing a thermal choke between the first and second planar temperature sensors.

24. The method of claim 17 wherein said step of maintaining a predetermined temperature difference between the first temperature sensor and the second temperature sensor comprises the steps of sensing a temperature of the first RTD; sensing a temperature of the second RTD; and applying heat near the periphery of the first RTD to maintain the predetermined temperature difference.

25. A thermal mass flow sensor comprising:

a housing comprising a first support region and a second support region;

a first substrate at the first support region and a second substrate at the second support region, said first substrate being mounted at an angle of about 12 to 70 degrees to said second substrate;

a first planar temperature sensor formed on said first substrate;

a second planar temperature sensor formed on said second substrate;

a heating element arranged to heat said first temperature sensor; and a controller operably connected to said first temperature sensor, said second temperature sensor and said heating element, said controller controlling a power level to said heating element to maintain a temperature difference between said first temperature sensor and said second temperature sensor.

26. The sensor of claim 25 wherein said first support region comprises a first recess.

27. The sensor of claim 25 wherein said first substrate is mounted at an angle of about 20 to 40 degrees to said second substrate.

28. The sensor of claim 25 wherein said first substrate is mounted at an angle of about 30 degrees to said second substrate.

29. A method of measuring mass flow comprising the steps of:

providing a first thin film RTD and a second thin film RTD;

forming a thin film heating element around the first thin film RTD;

mounting the first thin film RTD in a mass flow passageway defining a mass flow direction at a first angle to the mass flow direction;

mounting the second thin film RTD in the mass flow passageway at a second angle to the mass flow direction;

maintaining a predetermined temperature difference between the first RTD and second RTD; and determining a mass flow from an amount of power required to maintain the predetermined temperature difference.

30. The method of claim 29 wherein said step of mounting the second thin film RTD comprises the step of mounting the second thin film RTD in the mass flow passageway at a second angle equal to the first angle.

31. The method of claim 30 wherein said step of mounting the first thin film RTD in a mass flow passageway comprises the step of mounting the first RTD at an angle of about 6 to 35 degrees to the mass flow direction.

32. The method of claim 30 wherein said step of mounting the first RTD in a mass flow passageway comprises the step of mounting the first RTD at an angle of about 10 to 20 degrees to the mass flow direction.

33. The method of claim 30 wherein said step of mounting the first RTD in a mass flow passageway comprises the step of mounting the first RTD at an angle of about 15 degrees to the mass flow direction.

34. The method of claim 29 wherein said step of mounting the first thin film RTD in a mass flow passageway comprises the step of mounting the first RTD at an angle of about 6 to 35 degrees to the mass flow direction.

35. The method of claim 29 wherein said step of mounting the first RTD in a mass flow passageway comprises the step of mounting the first RTD at an angle of about 10 to 20 degrees to the mass flow direction.

36. The method of claim 29 wherein said step of mounting the first RTD in a mass flow passageway comprises the step of mounting the first RTD at an angle of about 15 degrees to the mass flow direction.

* * * * *